Figure 1:
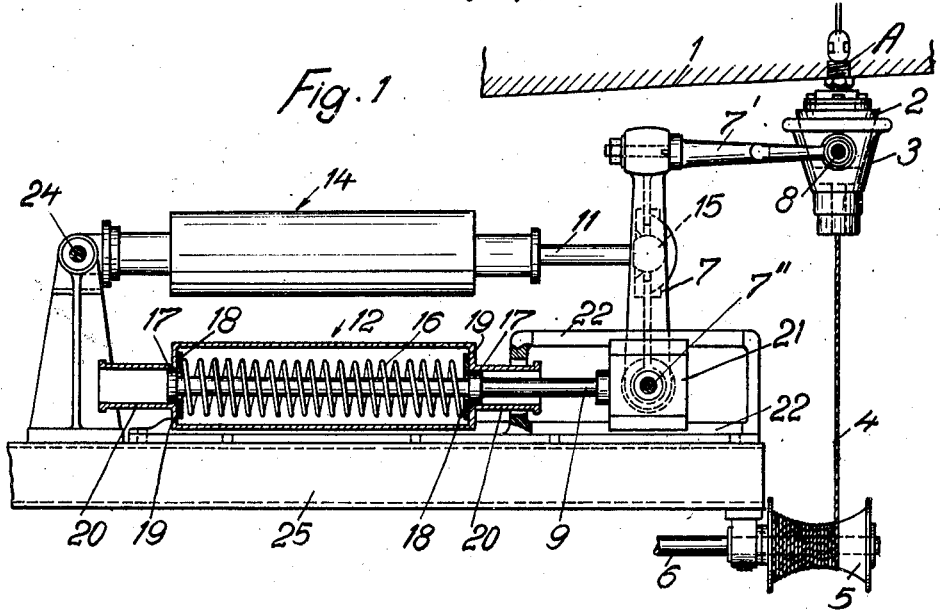

March 26, 1929.  B. SCHNITZER ET AL  1,706,415
ANCHORING DEVICE FOR AIRSHIPS
Filed July 21, 1925   2 Sheets-Sheet 1

Inventors:
Beno Schnitzer
Wilhelm F. Dörr
by Cruse Hmann
their Attorneys.

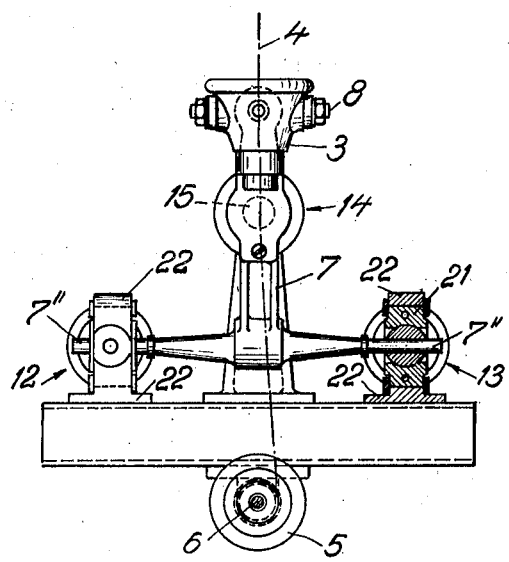

Patented Mar. 26, 1929.

1,706,415

UNITED STATES PATENT OFFICE.

BENO SCHNITZER, OF AKRON, OHIO, AND WILHELM E. DÖRR, OF FRIEDRICHSHAFEN, GERMANY, ASSIGNORS TO LUFTSCHIFFBAU ZEPPELIN GESELLSCHAFT MIT BESCHRANKTER HAFTUNG, OF FRIEDRICHSHAFEN, GERMANY.

ANCHORING DEVICE FOR AIRSHIPS.

Application filed July 21, 1925, Serial No. 44,985, and in Germany August 2, 1924.

Our invention relates to devices for fastening or anchoring airships.

The term airship is intended to refer to an aerostat, that is, an aircraft having buoyancy, in contradistinction to the airplane which is an aircraft heavier than air.

If airships are fastened to the ground or to a mast they have to sustain enormous stresses at their anchoring point, especially in gusty weather. It is our aim to lessen such extreme stresses by introducing a resilient and elastic means at the anchoring point, which will allow for an easy movement around said point and at the same time render harmless to the airship all possible sudden thrusts.

For this purpose we do not moor the airship directly to the predetermined mooring point but to a special device which itself may be connected rigidly to the ground or to the mooring mast. This device, according to our invention comprises elastic and resilient means arranged in such relation to each other as to provide for a secure mooring of the airship but at the same time providing for a deadening of every shock or force to which it may be subjected in any possible direction.

Such an arrangement may consist of a frame in connection with tension or compression springs and a system of levers. Or it may comprise other suitable means for providing a secure fastening that is elastic in every direction.

Having given a general description of our invention we now want to point it out in detail referring to the drawings which embody an example thereof.

Figure 2:
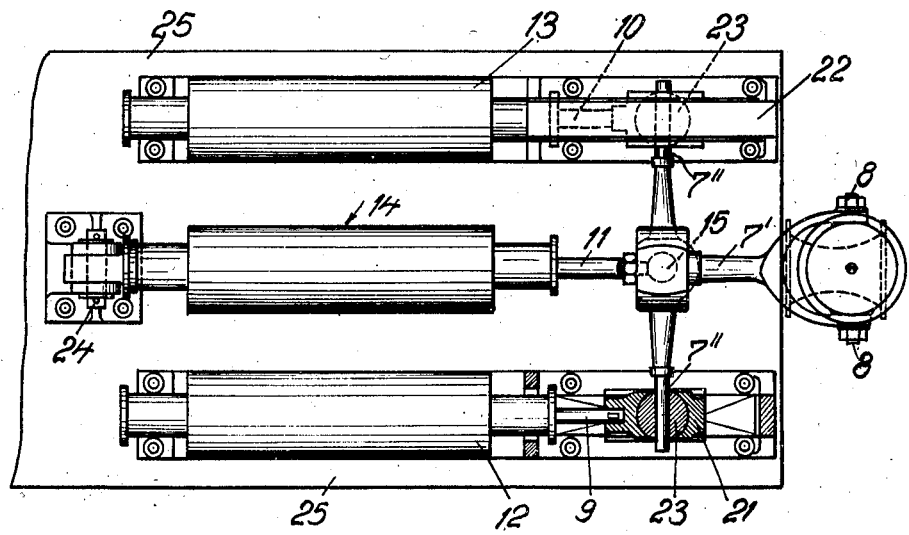

Fig. 1 is a side elevation of a device of the kind described, parts being shown in section. Fig. 2 is a plan view of the same; and Fig. 3 shows the same in front view, partly in vertical section.

The lower contour of the airship at its anchoring point A is designated by 1. At A a coupling is provided comprising part 2 rigidly connected to the airship 1 and part 3 which forms part of our mooring device. This part 3 may have a vertical hole for allowing an anchoring rope 4 to pass through for the purpose of being hauled to a winch 5 which may be operated in any suitable way by means of shaft 6. Socket 3 is supported on rod 7′ by shaft 8 around which it may swing. Rod 7′ is rigidly connected to rod 7 but at right angles thereto. The middle portion of rod 7 by means of ball 15 and its corresponding bearing is held by rod 11. The lower end of rod 7 branches off in two horizontal arms 7″ which are held in balls 23 surrounded by cross heads 21 running in horizontal guides 22. Rod 11 works into the upper cylinder 14, while rods 9 and 10 work into the lower cylinders 12 and 13, respectively. The inside arrangement of all three cylinders is practically alike. Each contains a compression spring 16 situated between loosely arranged rings 18 against which collars 17 bear in either direction of movement of rod 9. The lower cylinders are fixed in their position relative to the supporting frame 25 while cylinder 14 may swing around shaft 24.

This device will work in the following way:

In case of a vertical movement of anchoring point A cylinder 14 will work in opposite direction to cylinders 12 and 13. The same action will occur in case of horizontal movements of point A, while side pressure on the airship and its anchoring point acting at right angles to the drawing plane of Fig. 1 will cause opposite actions in cylinders 12 and 13.

We do not want to be limited to the example described or the details shown in the drawings as many variations will occur to those skilled in the art.

What we claim is:

1. A mooring device for anchoring an airship comprising a supporting means, a resilient mechanism included in the supporting means and a connection between said means and the airship constituting a single connecting point universally yieldable against the resilient mechanism to all shocks transmitted to and from the airship in any direction whatever while the airship is actually moored.

2. A mooring device for anchoring an airship comprising a resilient mechanism including a supporting means and a positive coupling between said means and the airship constituting a single connecting point universally yieldable against the resilient mechanism to all shocks transmitted to the airship from any direction whatever.

3. A mooring device for an airship comprising supporting means, a yieldable mechanism including a plurality of levers constituting a part of the supporting means and a connection betwen said means and the airship constituting a single connecting point universally yieldable against said mechanism in response to all shocks transmitted in any direction by the airship.

4. A mooring device for an airship comprising supporting means, a resilient mechanism having a plurality of levers incorporated therein constituting a part of the supporting means and a coupling between said means and the airship for receiving all forces tending to move the airship relative thereto, said coupling constituting a single point connection universally yieldable against said resilient mechanism in response to all shocks transmitted in any direction by the airship.

5. A mooring device for an airship comprising supporting means, a plurality of levers having springs attached thereto constituting a portion of the supporting means and a coupling between said means and the airship constituting a single connecting point universally yieldable against said springs in response to all shocks occurring between the airship and the supporting means.

6. A mooring device for an airship comprising supporting means, a yieldable mechanism included in said supporting mechanism and a two part coupling having one part secured to the supporting means and the other part secured to the airship, said coupling constituting the single connecting point universally yieldable against said mechanism in response to all shocks from any direction occurring between the supporting means and the airship, said coupling serving as a sole connection between the airship and the supporting means.

7. A mooring device for an airship comprising a supporting frame, a plurality of levers having springs attached thereto mounted upon the frame, and a two part coupling having one part secured to one of the levers and the other part secured to the airship, said coupling constituting a single connecting point universally yieldable through the levers against the springs in response to all shocks occurring between the supporting frame and the airship while the latter is anchored.

BENO SCHNITZER.
WILHELM E. DÖRR.